July 30, 1940.  G. H. KARLSTEEN  2,209,775
AIR CONDITIONING METHOD AND APPARATUS
Filed Oct. 12, 1937  2 Sheets-Sheet 1
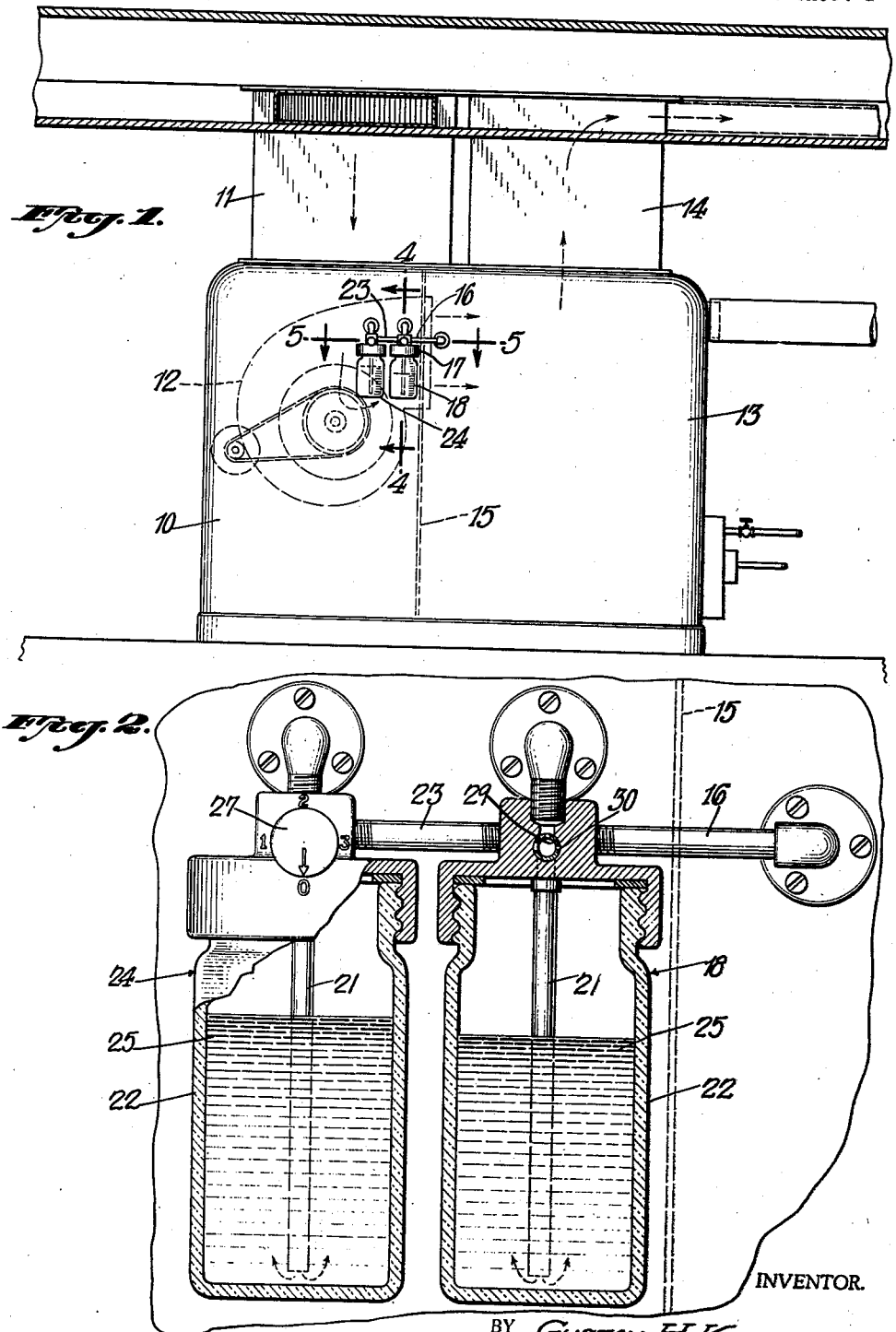
INVENTOR.
BY GUSTAV H. KARLSTEEN.
ATTORNEYS

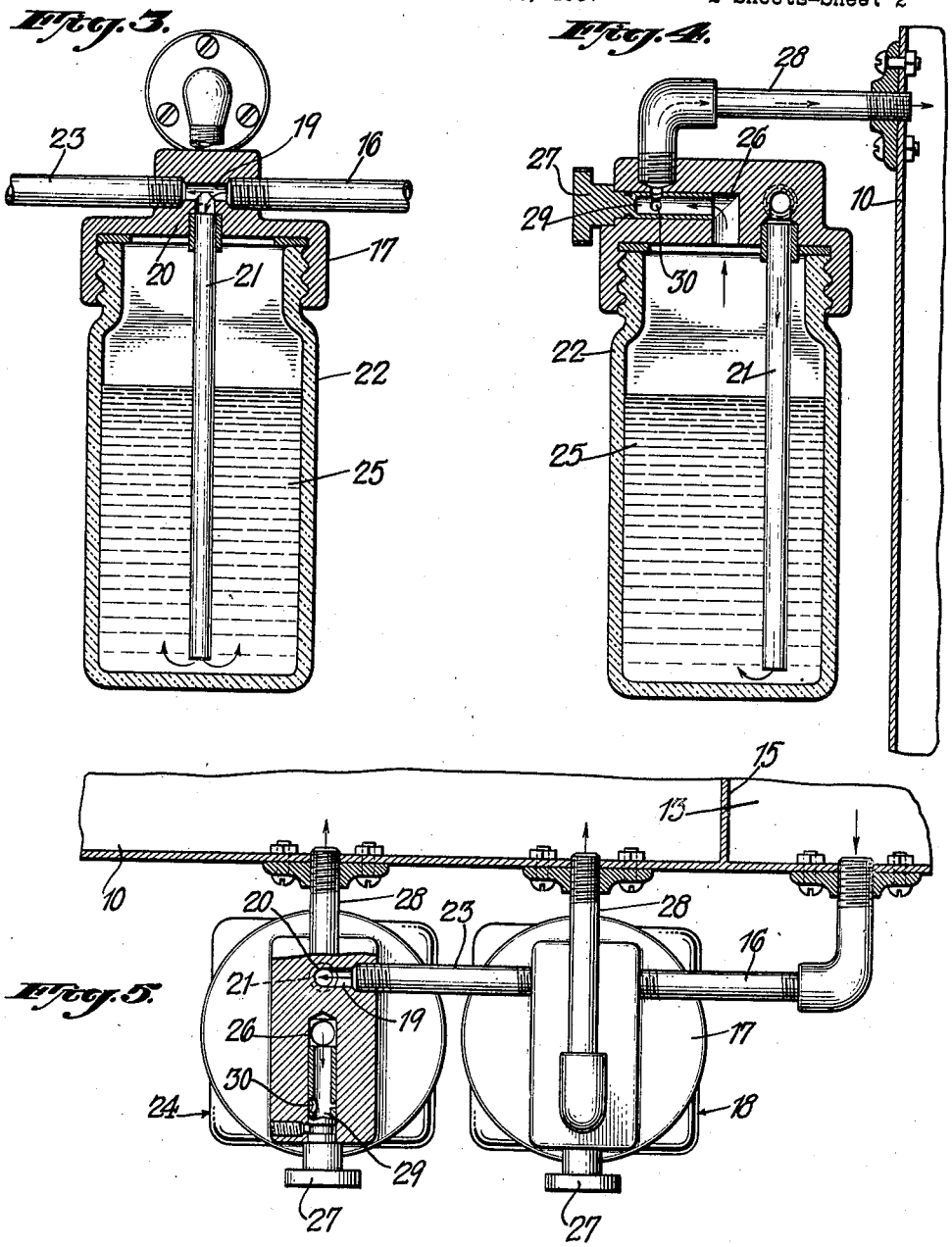

Patented July 30, 1940

2,209,775

UNITED STATES PATENT OFFICE 2,209,775

AIR CONDITIONING METHOD AND APPARATUS

Gustav H. Karlsteen, Tonawanda, N. Y.

Application October 12, 1937, Serial No. 168,575

5 Claims. (Cl. 21—53)

My invention relates to the conditioning of air for buildings such as homes, apartments, hospitals, manufacturing and other buildings.

Air for heating and ventilating in buildings of the above type is drawn from any suitable source, such as the atmosphere or through a return conduit from the rooms to be supplied and is then forced by a fan into the supply system from which it is distributed to the various rooms. The air supplied in this manner is generally filtered as, for example, through glass wool or mineral wool coated with some adhesive or sticky material to remove dust particles. Even the most efficient filters do not, however, remove all of the dust particles which may carry with them pathogenic and other bacteria or microorganisms. Relatively large quantities of such material carrying disease organisms or other deleterious material may thus be supplied with the ventilating air.

In my invention I provide a method and apparatus whereby the air thus supplied for distribution in various rooms may be treated with a germicidal agent, or with a deodorant or other volatilized material, such as insecticides, etc. In this way the air supplied to the rooms may be free from pathogenic bacteria, or may be treated with a deodorizing or other reagent for neutralizing disagreeable or toxic impurities. These may be used either separately or in conjunction as desired.

The invention may also be used for the purpose of carrying a reagent to kill or drive out insects or other pests. Means are also provided for controlling the admission of the treating agent to the circulating air. The material for treating the air may be in any suitable state as, for example, a volatile liquid or solid in granular form or a mixture of solid and liquids or adsorbed vapors.

The various features of my invention are illustrated by way of example in the accompanying drawings in which—

Fig. 1 is a side elevation of a ventilating and air conditioning apparatus embodying a preferred form of the invention. Fig. 2 is a vertical sectional view of vaporizing or saturating elements forming a part of the apparatus of Fig. 1, the sections being taken on a plane parallel to that of the elevation. Fig. 3 is a vertical section taken on a plane parallel to that of Fig. 2 through one of the vaporizing or saturating elements. Fig. 4 is a vertical section of the vaporizing or saturating elements taken on the line 4—4 of Fig. 1, and Fig. 5 is a plan taken partly in section on the line 5—5 of Fig. 1 of the saturating elements and a part of the air supply chambers.

In the specific embodiment of the invention shown in the accompanying drawings, air is drawn into a low pressure chamber or compartment 10 through any suitable inlet as, for example, from the outside atmosphere or through a return duct 11 and is then forced by a fan 12 or other impelling element into a higher pressure compartment or chamber 13 in which it may be heated or cooled and then distributed through ducts 14 leading to rooms to be ventilated. The compartments 10 and 13 are separated by a partition 15.

A small amount or stream of air is supplied from the chamber 13 through a bleed pipe or tube 16 to the cap 17 of a container 18. The air supplied through the pipe 16 is received in a conduit 19 and cap 17 which has a downwardly extending branch 20 leading to a depending tube 21 extending toward the bottom of a receptacle 22 attached to the cap 17 by screw threads, as indicated in the drawings, or by other suitable means.

The passage 19 may also lead to a second pipe 23 that forms a continuation of the tube 16 and leads to the cap of a second container 24 which may be similar to the container 18. The air supplied to the lower part of the containers 18 or 24 through the pipe 21 flows upwardly through a body of liquid 25, if a liquid treating agent is employed, or through a supply of solid material, if a solid is to be employed. In contact with the treating material the air is saturated with it.

The air saturated with the treating material accumulates in the upper port of the containers 18 and 24 and then passes into a passage 26 and thence through a control valve 27 into an outlet pipe 28 leading to the compartment 10. The relatively small stream of saturated air thus enters the compartment 10, is mixed and diluted with the volume of air in this compartment and then forced by the fan 12 into the compartment 13.

It will be understood that only a small part of the air is thus circulated from the compartment 13 to the compartment 10 through the saturating apparatus. Substantially all of the treating material, therefore, passes through the ducts 14 for distribution to the rooms.

The control valves 27 comprise a cylindrical recess 29 into which the air from the passage 26 enters and has a number of openings 30 distributed about the circumference of this recess through which the air passes to the return tube 28.

As indicated in Fig. 2, the control valve 27 may be rotated to place any one of the openings 30 into communication with the pipe 28 in order to regulate or control the amount of air passing through the treating containers. Or the valve may be turned to a position to close the passage.

Through the above apparatus the air may be treated to any desired extent with any suitable treating agent, for example, a germicide or disinfectant, such as carbolic acid, which may be vaporized into air to be treated in quantities just sufficient to kill certain pathogenic or other bacteria. Or such a healing material as menthol may be supplied to aid in the prevention or curing of colds. A deodorant such as oil of balsam may be employed to freshen the atmosphere.

A fumigant or insecticide may also be used for driving away insects, etc., the control valves permitting the treatment to be discontinued during normal operation. For example, filling one of the receptacles or containers with paradichlor benzene crystals can be used for the extermination of moths.

The receptacles 22 being detachable from the caps 17 permit the containers to be readily filled or refilled with treating agents.

What I claim is:

1. Air conditioning apparatus which comprises a low pressure air source, a higher pressure air compartment, means for forcing air from said lower pressure source into said higher pressure compartment, a container comprising a cap and a receptacle detachably connected to said cap, an inlet tube extending from said higher pressure compartment to said cap, an outlet from said cap to said low pressure air source and means for conducting air from said cap to the lower part of said receptacle.

2. Air conditioning apparatus which comprises a receiving chamber having inlet ducts for the inflow of air to be received and stored in said chamber, a supply chamber having outlet ducts for the distribution of air, means for forcing air from said receiving chamber to said supply chamber, a container for material to be vaporized and means for passing a small amount of air from said supply chamber into said container in contact with said material to be vaporized and from said container to said receiving chamber.

3. Air conditioning apparatus which comprises a receiving chamber having inlet ducts for the inflow of air to be received and stored in said chamber, a supply chamber having outlet ducts for the distribution of air, means for forcing air from said receiving chamber to said supply chamber against a higher pressure in said supply chamber, a container for material to be vaporized and means for passing air from said supply chamber to said container and then to said receiving chamber to absorb vapors in said container and carry them into said receiving chamber and means for regulating the passage of air through said container.

4. Air conditioning apparatus which comprises a receiving chamber having inlet ducts for the inflow of air to be received and stored in said chamber, a supply chamber having outlet ducts, means for forcing air from said receiving chamber into said supply chamber against a higher pressure in the latter than that in said receiving chamber, a container comprising a cap and a receptacle detachably connected to said cap, an inlet tube extending from said supply chamber to said cap and into said container and a return tube from said cap to said receiving chamber.

5. A method of conditioning air which comprises moving said air from a low pressure supply source to a distributing station, by-passing a small part of said air from said distributing station to said lower pressure source, introducing said by-passed air into a body of volatile material to absorb the same, withdrawing the treated by-passed air from the body of volatile material and returning said treated by-passed air to said lower pressure source.

GUSTAV H. KARLSTEEN.